US012592258B2

(12) United States Patent
Scarlett

(10) Patent No.: US 12,592,258 B2
(45) Date of Patent: Mar. 31, 2026

(54) METHOD AND APPARATUS FOR INTERACTIVE VIDEO EDITING PLATFORM TO CREATE OVERLAY VIDEOS TO ENHANCE ENTERTAINMENT VIDEO GAMES WITH EDUCATIONAL CONTENT

(71) Applicant: Skyler C Scarlett, Carmel Valley, CA (US)

(72) Inventor: Skyler C Scarlett, Carmel Valley, CA (US)

(73) Assignee: Game Class Inc, Carmel Valley, CA (US)

( * ) Notice: Subject to any disclaimer, the term of this patent is extended or adjusted under 35 U.S.C. 154(b) by 0 days.

(21) Appl. No.: 19/070,510

(22) Filed: Mar. 4, 2025

(65) Prior Publication Data

US 2025/0285645 A1 Sep. 11, 2025

Related U.S. Application Data

(60) Provisional application No. 63/561,733, filed on Mar. 6, 2024.

(51) Int. Cl.
| | |
|---|---|
| *G11B 27/028* | (2006.01) |
| *G09B 5/06* | (2006.01) |
| *G09B 7/02* | (2006.01) |
| *G06Q 50/20* | (2012.01) |
| *H04N 21/431* | (2011.01) |
| *H04N 21/475* | (2011.01) |

(52) U.S. Cl.
CPC .............. *G11B 27/028* (2013.01); *G09B 7/02* (2013.01); *G06Q 50/20* (2013.01); *H04N 21/4316* (2013.01); *H04N 21/4758* (2013.01)

(58) Field of Classification Search
None
See application file for complete search history.

(56) References Cited

U.S. PATENT DOCUMENTS

| | | | |
|---|---|---|---|
| 8,984,405 B1 * | 3/2015 | Geller | ................ G06F 3/04817 |
| | | | 715/753 |
| 10,360,946 B1 * | 7/2019 | Pasala | .................. G11B 27/036 |

(Continued)

*Primary Examiner* — Hung Q Dang

(57) ABSTRACT

The embodiments herein provide a method and an interactive video editing platform to create overlay videos. The platform comprises a video display interface unit configured to display gameplay footage, including pre-existing videos, recorded game clips, screen recordings, video recordings, or audio recordings, uploaded via a video uploading user interface unit. An overlay screen creation unit enables an overlay screen over the displayed gameplay footage by receiving input from a creator through a user input receiving unit. The overlay screen creation unit integrates one or more overlay elements onto the overlay screen, which may include voiceovers, drawings, text, quizzes, and interactive annotations. A rendering unit processes and renders the integrated overlay elements in real-time, generating overlay videos. The platform enhances interactive content creation by enabling dynamic, AI-driven overlays for education, accessibility, and engagement, facilitating real-time content adaptation, analytics, and gamified learning experiences in video-based environments.

12 Claims, 11 Drawing Sheets

(56)        References Cited

U.S. PATENT DOCUMENTS

| | | | |
|---|---|---|---|
| 2015/0290540 A1* | 10/2015 | Trombetta | A63F 13/79 |
| | | | 463/31 |
| 2018/0302677 A1* | 10/2018 | Patel | H04N 21/25891 |
| 2022/0108727 A1* | 4/2022 | van Welzen | G11B 27/031 |
| 2024/0226701 A1* | 7/2024 | Yen | A63B 71/0605 |

* cited by examiner

200

Figure 3:
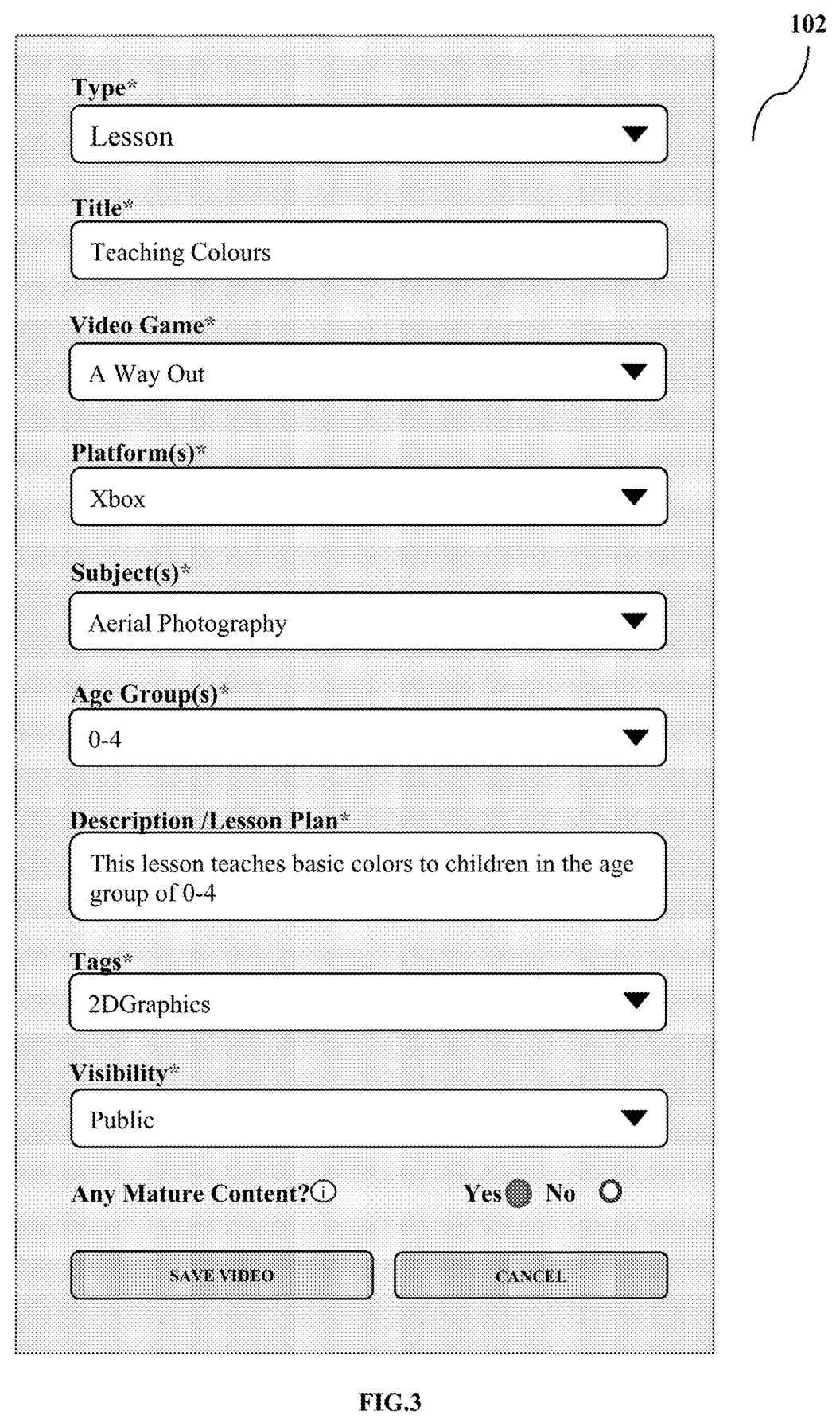

102

Type*

Lesson ▼

Title*

Teaching Colours

Video Game*

A Way Out ▼

Platform(s)*

Xbox ▼

Subject(s)*

Aerial Photography ▼

Age Group(s)*

0-4 ▼

Description /Lesson Plan*

This lesson teaches basic colors to children in the age group of 0-4

Tags*

2DGraphics ▼

Visibility*

Public ▼

Any Mature Content?ⓘ          Yes ◉  No ◯

SAVE VIDEO          CANCEL

My Lessons

Naresh Game

Gagan Kumar | 3 views

Private Public

100

Boards

Figure 7:
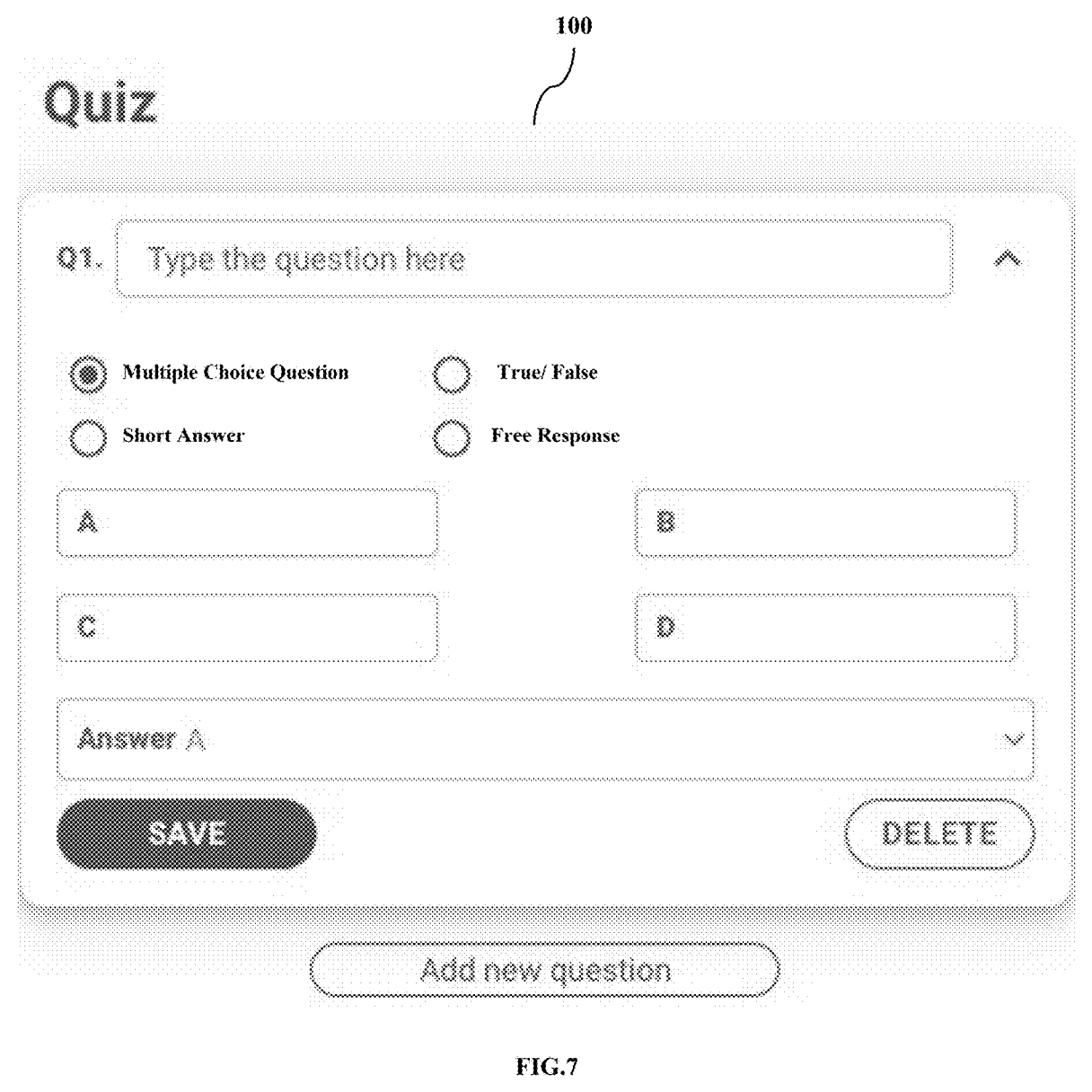

100

Quiz

Q1. | Type the question here | ^

◉ Multiple Choice Question     ◯   True/ False

◯ Short Answer     ◯   Free Response

| A | | B |

| C | | D |

| Answer A | ⌄ |

SAVE        DELETE

Add new question

METHOD AND APPARATUS FOR INTERACTIVE VIDEO EDITING PLATFORM TO CREATE OVERLAY VIDEOS TO ENHANCE ENTERTAINMENT VIDEO GAMES WITH EDUCATIONAL CONTENT

PRIORITY DETAILS

The present application is based on, and claims priority from an U.S. application Ser. No. 63/561,733 filed on 6 Mar. 2024, the disclosure of which is hereby incorporated by reference herein.

FIELD

The present invention relates to interactive video editing platforms, and more particularly, to an interactive video editing platform and a method for generating overlay videos with integrated educational and accessibility-focused elements.

BACKGROUND

In recent years, video games have gained immense popularity among students, engaging individuals across various age groups with their immersive gameplay experiences and interactive narratives. The dynamic nature of video games makes them a preferred form of entertainment, providing stimulating and engaging content tailored to diverse interests and preferences. However, alongside their widespread adoption, concerns have arisen regarding the potential impact of video game consumption on cognitive development and academic performance, particularly among students.

While video games can enhance cognitive skills such as problem-solving and spatial reasoning, their passive nature often limits their ability to contribute to meaningful educational outcomes. Many students and children spend substantial time engaging with video game content, sometimes at the expense of academic activities. This trend has led to growing concerns about balancing entertainment with education and maximizing the potential of video game content for constructive learning.

There also exists a longstanding separation between entertainment and education within the realm of video games. While video games have the potential to support educational objectives, their integration into learning environments has primarily been limited to standalone educational games or supplementary digital resources. These approaches, while beneficial, do not always fully leverage the interactive and immersive nature of video game experiences for educational purposes.

Traditional video editing tools provide users with the ability to add overlays such as text, images, and animations to video content. However, these tools are primarily designed for general media production and do not inherently support interactive or educational applications. Additionally, many educational video platforms focus on delivering pre-recorded content, lacking real-time engagement features that could enhance instructional effectiveness. As a result, there is an increasing interest in exploring ways to enhance video content with more dynamic and engaging elements, particularly in the context of education.

SUMMARY

Accordingly, the embodiments herein provide an interactive video editing platform for creating overlay videos. The interactive video editing platform comprises a Video Display Interface Unit configured to display gameplay footage. The gameplay footage includes at least one of a pre-existing video, a recorded video game clip, a screen recording, a video recording, or an audio recording. The gameplay footage is uploaded to the interactive video editing platform through a Video Uploading User Interface Unit. The platform further includes an Overlay Screen Creation Unit, which is configured to enable an overlay screen over the displayed gameplay footage to render one or more overlay elements. The overlay screen is activated by receiving input from a creator through a user input receiving unit, allowing the integration of one or more overlay elements onto the overlay screen displayed over the gameplay footage. Additionally, the platform includes a Rendering Unit configured to render the integrated overlay elements onto the overlay screen in real-time, thereby generating an overlay video.

In an embodiment, the one or more overlay elements include at least one of: voiceovers, videos, drawings, shapes, mathematical equations, numerical ratings, spelling and grammar corrections, text, highlights, pointers, calculators, rulers, measurements, arrows, chalkboards, color boards, whiteboards, quizzes, sign language symbols, scientific symbols, timestamps, and questions.

In an embodiment, the one or more overlay elements are dynamically adjustable in at least one of: size, position, blur, and opacity to optimize visibility and user interaction.

In an embodiment, the interactive video editing platform is configured to: enable a user to record a voice or video using a microphone or camera device; and automatically synchronize the recorded voice or video with the gameplay to enhance the end-user learning experience.

In an embodiment, the interactive video editing platform enables the creator to create assessments and assign metadata to the generated overlay video, the metadata comprising at least one of: an assessment title, video game name, supported platforms, subject, target age group, instructions, tags, visibility settings, learning objectives, required materials, applicable standards, teaching methods, assessment methods, assessment guidelines, grading rubric, and student role-play parameters.

In an embodiment, the interactive video editing platform allows the creator to indicate whether the content includes mature content.

In an embodiment, the interactive video editing platform enables assigning an Entertainment Software Rating Board (ESRB) rating to the content based on the rating of the associated overlay video, and wherein an artificial intelligence (AI)-driven assessment module assigns an ESRB rating if an official rating is not available.

In an embodiment, a user or consumer can filter content at one or more levels, including filtering content flagged as mature by the creator, filtering based on ESRB rating, or applying other filters to restrict access to content deemed suitable only for a mature audience.

In an embodiment, the interactive video editing platform further includes an AI-driven recommendation engine that suggests one or more parameters, including type of lesson, tags, and age groups, based on historical data and content relevance.

In an embodiment, the rendering unit ensures smooth integration of educational into the gameplay experience as per a pre-configured timeline, enhancing the educational value of the video game.

In an embodiment, the interactive video editing platform is configured to: enable content creators to share the generated overlay videos with consumers; track and evaluate consumer responses for the shared overlay videos; enable consumers to grade lessons on a predefined scale and provide numerical ratings for overlay videos; provide content creators with comprehensive analytics on video viewers, including grading, ratings, and engagement metrics, to facilitate informed assessment and future planning; enable content creators or educators to create assessments for user participation; enable users to take assessments created by the content creators or educators; enable content creators to grade user-submitted assessments; enable content creators to host competitions to encourage consumer participation; and integrate virtual reality and augmented reality elements from entertainment-based video games to enhance the educational experience.

In an embodiment, the interactive video editing platform further comprises a user authentication module configured to manage user access levels based on predefined roles, including schools, teachers, parents, content creators, and students.

In an embodiment, the interactive video editing platform is configured to: utilize an artificial intelligence (AI) recommendation engine to analyze consumer engagement and learning patterns; and provide content creators with insights and suggestions for creating engaging educational content.

In an embodiment, the interactive video editing platform is configured to: enable users to set a timeout duration for the display of a board/overlay elements within an overlay video based on the lesson requirements or content pace; and control the timing of the board/overlay appearance and disappearance during the playback of the overlay video.

In an embodiment, the interactive video editing platform is configured to: enable AI-driven suggestions for question generation, answer validation, and personalized feedback; enable a real-time analytics engine to track student responses, engagement levels, AI usage, logins, and comprehension metrics during assessment creation and interaction within the interactive video editing platform; enable a dynamic assessment mode that adapts question difficulty based on student performance and engagement patterns; and facilitate educators in creating, assigning, and reviewing assessments directly within the interactive video editing platform.

In an embodiment, the interactive video editing platform is configured to: enable interactive overlays to pause overlay gameplay to prompt student responses before allowing progression; and enable a gamified assessment structure to deliver instant feedback, score tracking, and achievement-based progression to students.

In an embodiment, the interactive video editing platform further comprises an AI-driven assessment module configured to generate AI-generated assessments and lessons from gameplay footage by: detecting one or more parameters from the gameplay footage, wherein the one or more parameters include in-game events, player interactions, and environmental changes; classifying the detected one or more parameters and mapping them to predefined educational concepts, learning objectives, or curriculum standards; generating overlays based on the mapped predefined educational concepts, learning objectives, or curriculum standards; and integrating the generated overlays into the gameplay footage for student assessments, wherein the generated overlays include at least one of: questions, quizzes, notes, shapes, text, and drawings.

In an embodiment, the AI-driven assessment module is configured to: automatically adjust question difficulty and content based on student responses and engagement patterns for the generated overlays; and analyze student interactions with the AI-generated assessments and provide performance insights and adaptive recommendations for personalized learning.

In an embodiment, the AI-driven assessment module utilizes computer vision and machine learning models to identify the one or more parameters from the gameplay footage.

In an embodiment, the AI-driven assessment module enables natural language processing and knowledge graphs to correlate the detected in-game events with subject-specific learning modules, ensuring alignment with predefined educational objectives.

In an embodiment, the AI-driven assessment module dynamically integrates the generated overlays into the gameplay footage based on detected gameplay context and predefined educational goals.

In an embodiment, the AI-driven assessment module allows educators to review and refine generated overlays, incorporating manual adjustments and customization options to enhance lesson accuracy and relevance.

In an embodiment, the AI-driven assessment module records interaction data, analyzes engagement patterns, and dynamically adapts lesson content in real time based on student responses and participation levels.

In an embodiment, the overlay screen creation unit is further configured to integrate accessibility-focused specialized overlay elements into the gameplay footage to support disabled students, wherein the accessibility-focused specialized overlay elements include special education prompts, ADHD overlays, autism overlays, executive function overlays, neurodivergent overlays, adaptive shapes, and sign language symbols.

In an embodiment, the sign language symbols include ASL (American Sign Language) gestures that accompany instructional content for students with hearing impairments.

In an embodiment, the accessibility-focused specialized overlay elements allow educators to customize question formats, including pictorial representations, simplified text prompts, and interactive response options tailored for students with cognitive disabilities.

In an embodiment, the AI-driven assessment module is configured to analyze student engagement and performance metrics to recommend personalized accessibility tools and content modifications.

In an embodiment, the overlay screen creation unit enables gesture-based or alternative input recognition, allowing students with limited motor function to interact with educational overlays through at least one of eye-tracking, speech commands, or adaptive controllers.

In an embodiment, the interactive video editing platform further comprises a time-based annotation module configured to: enable content creators to mark and describe key educational focus points or assessment demonstrations at specific timestamps within the gameplay footage; integrate the timestamps into real-time playback of the gameplay footage, displaying annotated learning moments to viewers during lesson progression; and aggregate timestamped student interactions to facilitate efficient evaluation and streamlined feedback.

In an embodiment, the timestamps are automatically generated by the AI-driven assessment module based on gameplay events, student interactions, or predefined learning objectives.

In an embodiment, the content creators and students can collaboratively add timestamps, enabling real-time annotation and peer review of assessments.

In an embodiment, the interactive video editing platform further comprises a grading interface that allows educators to navigate directly to timestamped responses, reducing assessment evaluation time and enhancing grading accuracy.

In an embodiment, the timestamps are exportable as structured learning reports, providing performance insights and time-based progress tracking for individual students or class-wide analysis.

In an embodiment, the interactive video editing platform further comprises: a curated video game clip repository containing a database of entertainment-based gameplay footage pre-selected and organized for educational use; a curated lesson repository comprising a database of pre-made lessons categorized by subject and gameplay footage, serving as a starting point for lesson creation; a context-aware tagging system that categorizes video game clips based on learning objectives, skill levels, and interactive engagement potential; a dynamic content personalization engine configured to automatically match video game templates to curriculum standards, student interests, learning subjects, and educator-defined lesson plans; and a cloud-based lesson integration tool that enables users to embed game clips into customized lessons, quizzes, and interactive assessments with minimal manual editing.

In an embodiment, each video game clip is tagged with subject-specific metadata, including STEM concepts, special education terminology, historical references, Esports concepts, and critical thinking challenges.

In an embodiment, an AI-driven recommendation system suggests relevant video game templates based on teacher preferences, student preferences, student progress data, and trending educational themes.

In an embodiment, a real-time content adaptation module allows content creators to modify clip overlays, add interactive elements, and adjust difficulty levels within the template.

In an embodiment, a student-driven exploration mode enables learners to browse and interact with curated gameplay templates as part of self-guided learning experiences.

In an embodiment, an AI-driven student engagement and interaction analysis module is configured to: monitor and record student responses, time spent on lessons, editor overlay usage, AI usage, AI prompts, AI responses, quiz attempts, and participation levels within interactive video content; calculate a dynamic engagement score based on student interaction frequency, response accuracy, time on task, and depth of interaction; assess student activity levels by tracking lesson completion rates, interaction timestamps, and question response rates; provide educators with student statistics, trend analysis, and engagement heatmaps for personalized instructional adjustments; and forecast student performance outcomes using machine learning algorithms based on historical interaction data and engagement trends.

In an embodiment, the engagement scores are calculated using a weighted algorithm incorporating reaction time, content replays, active participation, and quiz accuracy.

In an embodiment, the participation scores dynamically adjust based on student behavioral patterns, rewarding sustained effort, consistency, and collaborative interactions.

In an embodiment, the interactive video editing platform further comprises a student profile system that aggregates long-term learning insights, strengths, and knowledge gaps to enable adaptive lesson recommendations.

In an embodiment, the interactive video editing platform further comprises a classroom-wide analytics comparison tool that allows educators to benchmark student engagement and participation scores across groups or classes.

In an embodiment, the interactive video editing platform further comprises an AI-driven engagement advisor that provides automated recommendations for lesson pacing, content adjustments, and intervention strategies based on student participation trends.

In an embodiment, the interactive video editing platform further comprises a contest hosting module configured to: enable educators, organizations, or sponsors to design and launch educational competitions using interactive video game content; allow users to submit educational lessons, assessments, or interactive content based on video game clips; track and display contest rankings, participation statistics, and performance metrics; facilitate automated or manually reviewed scoring based on predefined criteria, including creativity, accuracy, engagement level, outreach, and educational effectiveness; allocate cash prizes, scholarships, grants, educational materials, or video game-related rewards to winners based on contest results; and allow brands, educational institutions, and game developers to contribute prizes, funding, and promotional content within the contest framework.

In an embodiment, the interactive video editing platform further comprises an AI-driven evaluation module configured to automatically score contest submissions based on user engagement, interactivity, and pedagogical effectiveness.

In an embodiment, the interactive video editing platform further comprises a public or private showcase portal that enables users to view contest entries, winners, and submission details.

In an embodiment, the interactive video editing platform further comprises a community voting system that allows students, educators, or the public to participate in selecting contest winners using peer-based evaluation metrics.

In an embodiment, the interactive video editing platform further comprises contest themes aligned with specific educational subjects, skills, or curriculum standards to guide participants toward relevant lesson objectives.

In an embodiment, the interactive video editing platform further comprises a contest sponsorship module, allowing contest sponsors to customize challenges, set prize tiers, and receive branded exposure through integrated video content and promotional assets.

In an embodiment, the interactive video editing platform enables users or consumers to support or incentivize content creators by providing financial assistance through donations or tips, or by sending messages or images.

Accordingly, the embodiments herein provide a method to create overlay videos. The method includes displaying a gameplay footage on an interactive video editing platform. The gameplay footage comprises at least one of a pre-existing video, a recorded video game clip, a screen recording, a video recording, or an audio recording, wherein the gameplay footage is uploaded to the interactive video editing platform through a Video Uploading User Interface Unit. The method further includes enabling an overlay screen over the displayed gameplay footage to render one or more overlay elements, wherein the overlay screen is enabled by receiving input from a creator on the gameplay footage through a user input receiving unit and integrate one or more overlay elements onto the overlay screen displayed over the gameplay footage. The one or more overlay elements include at least one of: voiceovers, videos, drawings, shapes, mathematical equations, numerical ratings, spelling and grammar corrections, text, highlights, pointers, calculators, rulers, measurements, arrows, chalkboards, color boards, whiteboards, quizzes, sign language symbols, scientific symbols, timestamps, and questions. The method further includes rendering the integrated one or more overlay elements onto the overlay screen displayed over the gameplay footage in real-time to generate an overlay video.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

Examples of the embodiments herein are illustrated in the accompanying drawings, throughout which reference letters and the like indicate corresponding parts in the various figures. The example embodiments herein will be better understood from the following description with reference to the drawings, in which:

FIG. 3 illustrates a Video Uploading User Interface Unit for enabling content creators to upload videos onto the interactive video editing platform to create overlay videos, in accordance with some embodiments;

FIG. 7 illustrates an interactive video editing platform to enable quiz as an overlay on an uploaded video, in accordance with some embodiments;

DETAILED DESCRIPTION OF THE INVENTION

Figure 1:
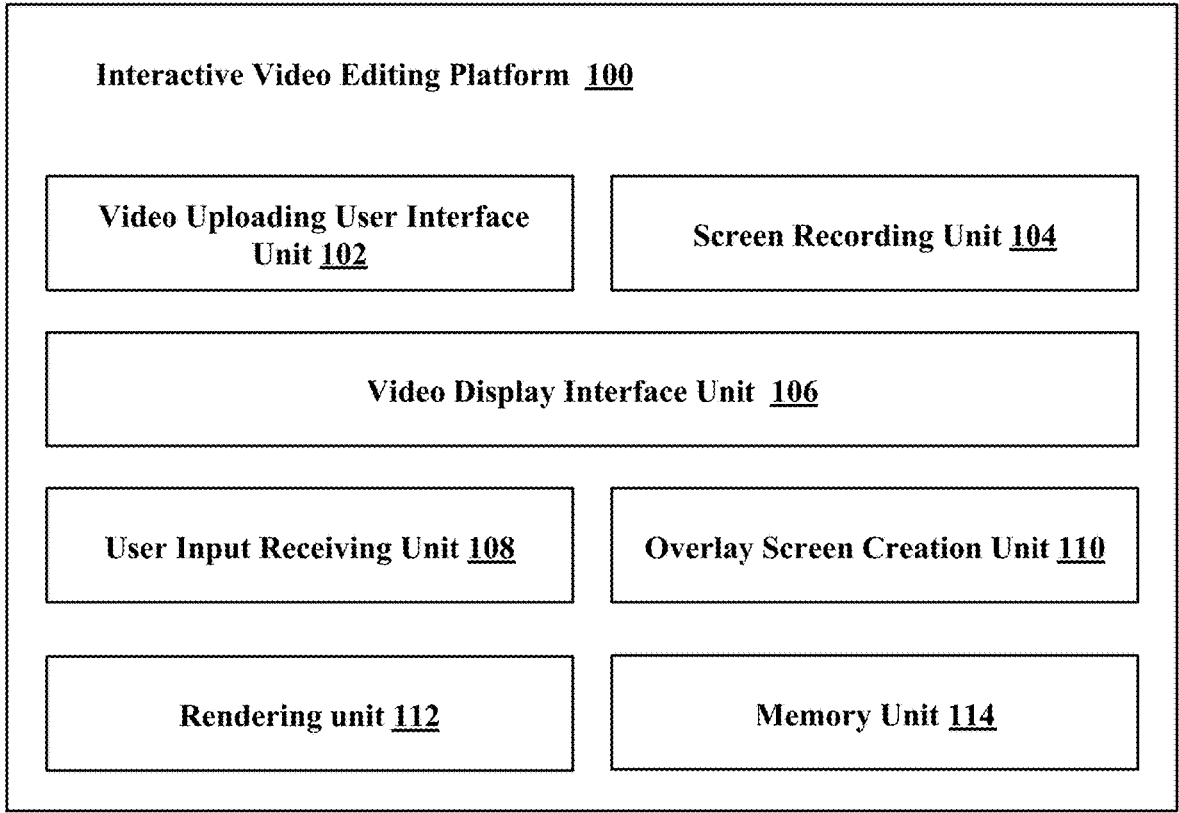
FIG. 1 illustrates various units of an interactive video editing platform to create overlay videos, in accordance with some embodiments.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

The embodiments herein and the various features and advantageous details thereof are explained more fully with reference to the non-limiting embodiments that are illustrated in the accompanying drawings and detailed in the following description. Descriptions of well-known components and processing techniques are omitted, so as not to unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein provide a method and an interactive video editing platform is provided for creating overlay videos. The interactive video editing platform comprises a Video Display Interface Unit configured to display gameplay footage. The gameplay footage includes at least one of a pre-existing video, a recorded video game clip, a screen recording, a video recording, or an audio recording. The gameplay footage is uploaded to the interactive video editing platform through a Video Uploading User Interface Unit. The platform further includes an Overlay Screen Creation Unit, which is configured to enable an overlay screen over the displayed gameplay footage to render one or more overlay elements. The one or more overlay elements include at least one of: voiceovers, videos, drawings, shapes, mathematical equations, numerical ratings, spelling and grammar corrections, text, highlights, pointers, calculators, rulers, measurements, arrows, chalkboards, color boards, whiteboards, quizzes, sign language symbols, scientific symbols, timestamps, and questions. The overlay screen is activated by receiving input from a creator through a user input receiving unit, allowing the integration of one or more overlay elements onto the overlay screen displayed over the gameplay footage. Additionally, the platform includes a Rendering Unit configured to render the integrated one or more overlay elements onto the overlay screen in real-time, thereby generating an overlay video.

Terms "Creator(s)" and "content creators" in embodiments of this specification are used interchangeably.

Referring now to the drawings, and more particularly to FIGS. 1 through 11, where similar reference characters denote corresponding features consistently throughout the figures, there are shown preferred embodiments.

FIG. 1 illustrates various units of interactive video editing platform 100 to create overlay videos, in accordance with some embodiments.

FIG. 1 illustrates an interactive video editing platform 100 configured for generating overlay videos by integrating interactive elements onto gameplay footage. The interactive video editing platform 100 includes a Video Uploading User Interface Unit 102, a Screen Recording Unit 104, a Video Display Interface Unit 106, a User Input Receiving Unit 108, an Overlay Screen Creation Unit 110, a Rendering unit 112 and a memory unit 114. The interactive video editing platform 100, wherein these components are seamlessly integrated to provide a comprehensive educational experience within the realm of video gaming.

The Video Display Interface Unit 106 configured to display gameplay footage, wherein the gameplay footage comprises at least one of pre-existing videos, recorded video game clips, screen recordings, video recordings, or audio recordings. The gameplay footage is uploaded to the interactive video editing platform 100 through the Video Uploading User Interface Unit 102, wherein the Video Uploading User Interface Unit 102 facilitates seamless importation of gameplay footage for editing, ensuring compatibility across various video formats and platforms.

The Overlay Screen Creation Unit 110 configured to generate at least one overlay screen over the displayed gameplay footage. The at least one overlay screen is activated in response to receiving an input from a creator through the User Input Receiving Unit 108, wherein the User Input Receiving Unit 108 enables the addition of interactive elements to the overlay screen, ensuring real-time responsiveness. The Rendering Unit 112 is configured to process and integrate the interactive elements in real-time, thereby generating an interactive overlay video with smooth transitions and synchronization. The interactive elements comprise at least one of voiceovers, videos, drawings, shapes, mathematical equations, numerical ratings, spelling and grammar corrections, text, highlights, pointers, calculators, rulers, measurements, arrows, chalkboards, color boards, whiteboards, quizzes, sign language symbols, scientific symbols, timestamps, and questions. The interactive elements are dynamically adjustable in at least one of size, position, blur, and opacity, thereby optimizing visibility and user interaction while preserving contextual accuracy within the gameplay footage.

The interactive video editing platform 100 further comprises a recording module (not shown) configured to capture voice or video using at least one of a microphone or a camera, wherein the recorded voice or video is synchronized with the gameplay footage to ensure precise alignment with in-game events. Additionally, the interactive video editing platform 100 is configured to generate assessments and metadata tagging to enable structured learning. The metadata comprises at least one of an assessment title, video game name, supported platforms, subject, target age group, instructions, tags, visibility settings, learning objectives, required materials, applicable standards, teaching methods, assessment methods, grading rubrics, and student role-play parameters, thereby enhancing searchability and discoverability of educational content. The interactive video editing platform 100 further comprises a content rating and filtering module (not shown) configured to allow creators to indicate mature content and assign an Entertainment Software Rating Board (ESRB) rating, wherein, in response to an absence of an official ESRB rating, an AI-driven assessment module (not shown) automatically assigns an appropriate rating based on content analysis. The interactive video editing platform 100 is further configured to allow users to filter content based on at least one of maturity level, ESRB rating, or additional filtering parameters, ensuring accessibility to age-appropriate content.

The interactive video editing platform 100 further comprises an AI-driven recommendation engine (not shown) configured to suggest at least one of lesson type, tags, or target age group based on historical data and content relevance, thereby optimizing content discovery for educators and learners. The Rendering Unit 112 is further configured to ensure that the interactive elements are integrated within the gameplay experience according to a pre-configured timeline, thereby enhancing the educational impact through structured pacing. The interactive video editing platform 100 is configured to enable content sharing with consumers while tracking responses, thereby allowing users to grade and rate lessons. The interactive video editing platform 100 further comprises an analytics module (not shown) configured to generate insights into video engagement, grading, and participation metrics, wherein the insights enable educators to assess student performance, engagement levels, and learning progress. The interactive video editing platform (100) is further configured to facilitate assessments, wherein users submit responses, and creators evaluate the responses or host competitions, thereby integrating virtual and augmented reality elements for an immersive learning experience.

The interactive video editing platform 100 further comprises a User Authentication Module (not shown) configured to manage access control for different user roles, wherein the different user roles comprise at least one of schools, teachers, parents, content creators, or students, thereby ensuring role-based privileges and security. The interactive video editing platform 100 further comprises an AI recommendation engine (not shown) configured to analyze consumer engagement and learning patterns, wherein the AI recommendation engine generates insights for content creators, optimizing content effectiveness. The interactive video editing platform 100 further enables customization of an overlay display duration, thereby allowing educators to control the timing of elements during lesson playback, ensuring effective pacing for different learning needs. The interactive video editing platform 100 further comprises an AI-driven assessment module (not shown) configured to facilitate at least one of question generation, answer validation, or personalized feedback, wherein the AI-driven assessment module tracks engagement levels and comprehension metrics in real time. The interactive video editing platform 100 is further configured to support dynamic assessments, wherein the difficulty level of the assessments is adapted based on student performance and interaction patterns, ensuring an adaptive learning experience.

The interactive video editing platform 100 further comprises an interactive overlay module (not shown) configured to pause gameplay in response to a student response prompt, thereby ensuring engagement before progression. The interactive video editing platform 100 further supports a gamified assessment structure, wherein instant feedback, score tracking, and achievement-based progression are provided to reinforce learning motivation. The AI-driven assessment module is further configured to generate assessments from gameplay footage by detecting at least one of in-game events, player interactions, or environmental changes. The AI-driven assessment module is further configured to map the detected parameters to predefined educational concepts and integrate corresponding interactive elements, wherein the interactive elements comprise at least one of questions, notes, or diagrams. The AI-driven assessment module is further configured to adapt content based on student responses, thereby ensuring personalized learning experiences. The interactive video editing platform 100 further comprises a computer vision module and a machine learning module, wherein the computer vision module and the machine learning module are configured to identify gameplay elements with high accuracy. The interactive video editing platform 100 further comprises a natural language processing module and a knowledge graph module, wherein the natural language processing module and the knowledge graph module are configured to correlate in-game events with subject-specific learning modules, enabling contextualized education.

The interactive video editing platform 100 further comprises an accessibility module (not shown) configured to generate specialized one or more overlay elements to support disabled students, wherein the specialized one or more overlay elements comprise at least one of special education prompts, ADHD overlays, autism overlays, executive function overlays, neurodivergent overlays, adaptive shapes, or sign language symbols. The accessibility module is further configured to enable gesture-based or alternative input recognition, wherein students with limited motor functions interact using at least one of eye-tracking, speech commands, or adaptive controllers. The AI-driven accessibility module is further configured to recommend personalized tools and content modifications based on engagement metrics, ensuring inclusivity.

The interactive video editing platform 100 further comprises a Time-Based Annotation Module (not shown) configured to allow content creators to mark and describe key educational points at specific timestamps within the gameplay footage. The Time-Based Annotation Module is further configured to integrate annotations into real-time playback, thereby displaying learning moments to viewers. The Time-Based Annotation Module is further configured to support timestamped student interactions, wherein timestamped interactions facilitate efficient evaluation and feedback. The Time-Based Annotation Module is further configured to enable an AI-driven component to generate timestamps based on at least one of gameplay events or student activity. The Time-Based Annotation Module is further configured to enable collaborative annotation, thereby facilitating real-time peer review. The interactive video editing platform 100 further comprises a grading interface (not shown) configured to allow educators to navigate directly to timestamped responses, thereby streamlining assessment.

The interactive video editing platform 100 further comprises a curated video game clip repository containing a database of pre-selected and organized gameplay footage for educational applications. A curated lesson repository comprises a database of pre-made lessons categorized by subject and gameplay footage, serving as a foundation for lesson creation. A context-aware tagging system categorizes video game clips based on learning objectives, skill levels, and interactive engagement potential. A dynamic content personalization engine is configured to automatically match video game templates to curriculum standards, student interests, learning subjects, and educator-defined lesson plans. A cloud-based lesson integration tool enables users to embed game clips into customized lessons, quizzes, and interactive assessments with minimal manual editing. Each video game clip is tagged with subject-specific metadata, including science, technology, engineering, and mathematics (STEM) concepts, special education terminology, historical references, Esports concepts, and critical thinking challenges. An AI-driven recommendation system suggests relevant video game templates based on teacher preferences, student preferences, student progress data, and trending educational themes. A real-time content adaptation module enables content creators to modify clip overlays, add interactive elements, and adjust difficulty levels within the template. A student-driven exploration mode enables learners to browse and interact with curated gameplay templates as part of self-guided learning experiences.

The interactive video editing platform 100 further comprises an AI-driven student engagement and interaction analysis module configured to monitor and record student responses, time spent on lessons, editor overlay usage, AI usage, AI prompts, AI responses, quiz attempts, and participation levels within interactive video content. The engagement score is dynamically calculated based on student interaction frequency, response accuracy, time on task, and depth of interaction. The system assesses student activity levels by tracking lesson completion rates, interaction timestamps, and question response rates. Educators are provided with student statistics, trend analysis, and engagement heatmaps for personalized instructional adjustments. Machine learning algorithms are utilized to forecast student performance outcomes based on historical interaction data and engagement trends. Participation scores are dynamically adjusted based on student behavioral patterns, rewarding sustained effort, consistency, and collaborative interactions. A student profile system aggregates long-term learning insights, strengths, and knowledge gaps to enable adaptive lesson recommendations. A classroom-wide analytics comparison tool allows educators to benchmark student engagement and participation scores across groups or classes. An AI-driven engagement advisor provides automated recommendations for lesson pacing, content adjustments, and intervention strategies based on student participation trends.

The interactive video editing platform 100 further comprises a contest hosting module (not shown) configured to enable educators, organizations, or sponsors to design and launch educational competitions using interactive video game content. The module allows users to submit educational lessons, assessments, or interactive content based on video game clips. Contest rankings, participation statistics, and performance metrics are tracked and displayed. Submissions are evaluated through automated or manually reviewed scoring based on predefined criteria, including creativity, accuracy, engagement level, outreach, and educational effectiveness. Contest results determine the allocation of prizes, which may include cash awards, scholarships, grants, educational materials, or video game-related rewards. Contest sponsors can customize challenges, set prize tiers, and receive branded exposure through integrated video content and promotional assets.

The interactive video editing platform 100 further comprises an AI-driven evaluation module (not shown) is configured to automatically score contest submissions based on user engagement, interactivity, and pedagogical effectiveness. A public or private showcase portal enables users to view contest entries, winners, and submission details. A community voting system allows students, educators, or the public to participate in selecting contest winners using peer-based evaluation metrics. Contest themes are aligned with specific educational subjects, skills, or curriculum standards to guide participants toward relevant lesson objectives. Additionally, the interactive video editing platform enables users or consumers to support content creators through financial assistance, donations, or tips, as well as through messages or images, incentivizing high-quality educational content development.

The interactive video editing platform 100 revolutionizes digital learning by seamlessly integrating interactive overlays, AI-powered analytics, gamified learning, and community engagement to enhance educational experiences.

The memory unit 114 is configured to store the video game clips and the screen recorded video clips. The memory unit 114 also configured to store relevant data and settings associated with the interactive video editing platform 100. The memory unit 114 also stores user preferences, overlay configurations, and progress made during the transformation of video games into educational lessons. Through the collaborative operation of these components, the interactive video editing platform 100 enables the seamless integration of educational overlays and enhancements into entertainment-based video games. It also enables customizing the interactions of the components as per the educational level and progress of the students who are watching the content. This innovative approach revolutionizes the way users engage with video game content, offering an immersive and interactive educational experience tailored to specific learning needs.

The present disclosure relates to an interactive video editing platform 100 that is a cloud-based system configured to facilitate access to educational video game content for various users, including but not limited to schools, teachers, parents, content creators, and students via an internet connection. The interactive video editing platform 100 enables users to sign up and access content from remote locations, ensuring flexibility and accessibility.

In an example embodiment, users such as content creators, upon signing up, are enabled to upload content onto the platform utilizing the Video Uploading User Interface Unit 102. The content creators may include, but are not limited to, educators, teachers, schools, students, parents, coaches, athletes, celebrities, or any individuals involved in creating educational content. Consumers or viewers may subsequently access and view the uploaded content.

In an embodiment, the interactive video editing platform 100 facilitates the sharing of educational overlay video game content through online network, expanding access to transformative educational materials. The platform effectively repurposes entertainment-based video games into structured educational lessons, making learning engaging and immersive.

In an embodiment, the Overlay Screen Creation Unit 110 comprises a plurality of tools, including but not limited to a whiteboard, chalkboard, and color board tool, which simulates a classroom whiteboard and enables content creators to incorporate at least one of drawings, text, or shapes as overlays. The Overlay Screen Creation Unit 110 is further configured to adjust the duration of display of the one or more overlay elements on the overlay screen. Additionally, a text tool is configured to overlay textual content onto the uploaded video, while a shapes tool enables the overlay of one or more shapes, wherein the transparency of the shapes is adjustable to highlight specific areas within the video content. A drawing tool allows for the creation of freehand drawings as overlays, with a feature that synchronizes the disappearance of drawn content when applied to boards. Furthermore, the Overlay Screen Creation Unit 110 includes a quiz tool configured to pause the video at predetermined timestamps and present one or more questions to viewers, supporting at least one of multiple-choice questions, true/false questions, short-answer responses, or free-response formats. A question tool is configured to pause the video and display one or more questions to facilitate viewer comprehension and engagement. A trim tool is included to edit the uploaded video by removing excess content. Additionally, a voice layover tool enables the overlay of additional voice recordings onto the uploaded video, and a video layover tool allows for the embedding of additional video content as overlays and the merging of multiple video clips into a structured sequence. The Overlay Screen Creation Unit 110 thereby facilitates the creation of interactive educational videos by enabling the seamless integration of instructional content through various overlay tools.

FIG. 1 shows exemplary units of the interactive video editing platform 100, but it is to be understood that other embodiments are not limited thereon. In other embodiments, the interactive video editing platform 100 may include less or more number of units. Further, the labels or names of the units are used only for illustrative purpose and does not limit the scope of the embodiments herein. One or more units can be combined to perform same or substantially similar function in interactive video editing platform 100.

Figure 2:
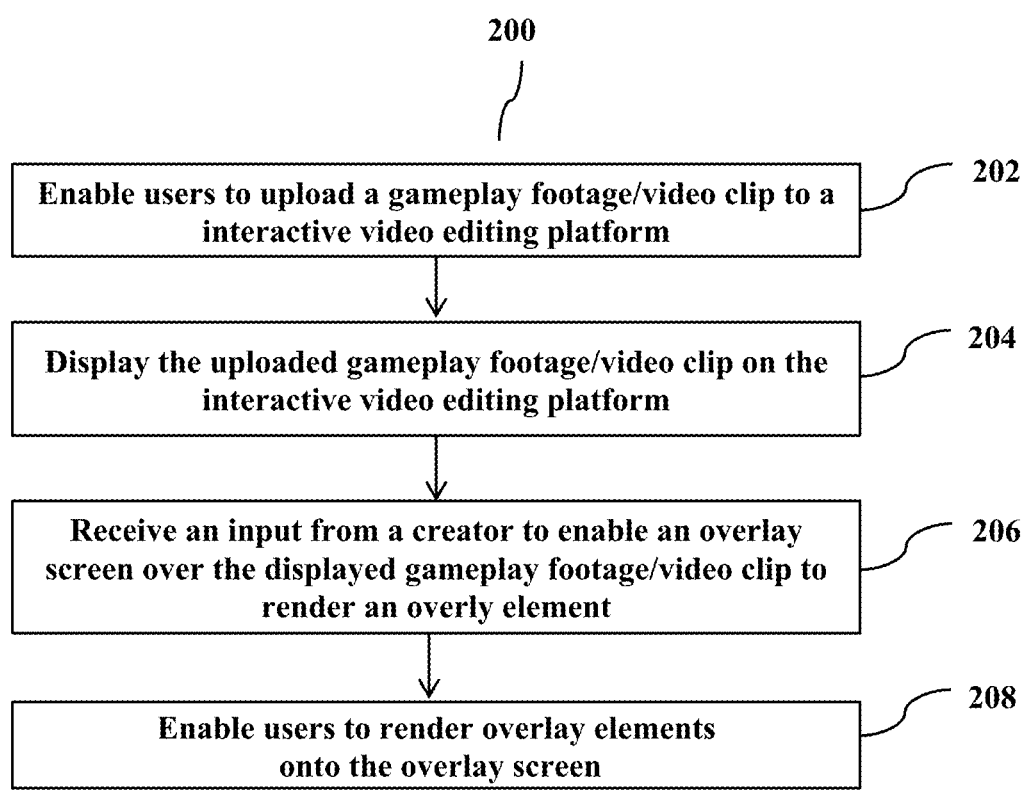
FIG. 2 illustrates a flow chart illustrating various units of an interactive video editing platform to create overlay videos, in accordance with some embodiments.

FIG. 2 illustrates a flow chart 200 illustrating various units of interactive video editing platform 100 to create overlay videos, in accordance with some embodiments.

At step 202, the method includes enabling users to upload entertainment-based video games/gameplay footage/video clip onto the interactive video editing platform 100. The method allows the Video Uploading User Interface Unit 102 to enable users to upload the entertainment-based video games/gameplay footage/video clip onto the interactive video editing platform 100. In another embodiment, the method allows the Screen Recording Unit 104 to record a screen while playing entertainment-based video games. The screen Recording unit 104 captures a gameplay footage, wherein the captured gameplay footage can then be utilized within the interactive video editing platform 100.

At step 204, the method includes displaying the uploaded or recorded entertainment-based video games/gameplay footage/video clip on the interactive video editing platform 100. The method allows the Video Display Interface Unit 106 to display the uploaded or recorded entertainment-based video games/gameplay footage/video clip on the interactive video editing platform 100.

At step 206, the method includes receiving the input form the user to enable an overlay screen over the displayed video to render the one or more overlay elements. The method allows the User Input Receiving Unit 108 to receive the input form the user to enable the overlay screen over the displayed video to render the one or more overlay elements.

At step 208, the method includes enabling the users to render overlay elements onto the overlay screen to create the overlay video. The method allows the rendering unit 112 to enable the users to render overlay elements onto the overlay screen to create the overlay video. The rendering unit 112 processes the overlay elements onto the displayed video clip in real-time. The rendering unit 112 ensures smooth integration of educational elements into the gameplay experience, enhancing the educational value of the video game.

The various actions, acts, blocks, steps, or the like in the method and the flow diagram 200 may be performed in the order presented, in a different order or simultaneously. Further, in some embodiments, some of the actions, acts, blocks, steps, or the like may be omitted, added, modified, skipped, or the like without departing from the scope of the invention.

FIG. 3 illustrates a Video Uploading User Interface Unit 102 for enabling the content creators to upload videos onto the interactive video editing platform 100 to create overlay videos, in accordance with some embodiments.

The Video Uploading User Interface Unit 102 can be configured to enable users to upload entertainment-based video games onto the interactive video editing platform 100. In an embodiment, the users can select pre-existing or recorded video game clips to upload to the interactive video editing platform 100. In another embodiment the interactive video editing platform 100 configures the Screen Recording Unit 104 to record a screen while playing entertainment-based video games using the screen recording unit 104. The screen recording unit 104 captures a gameplay footage, wherein the captured gameplay footage can then be utilized within the interactive video editing platform 100. The Video Uploading User Interface Unit 102 enables the user to upload the videos along with the following parameters. The parameters include at least one of but not limited to Type of lesson indicates the nature or format of the lesson being uploaded, title of the lesson (for example—teaching colors) indicates name of the lesson being uploaded, video game name indicates the name of the video game featured in the lesson, platform indicates the platforms (for example, PC, PlayStation, Xbox, Nintendo Switch, mobile devices) on which the video game is available, subjects (for example, aerial photography, mathematics, history, science, language arts, problem-solving, critical thinking, etc.) indicates the educational subjects covered in the lesson, age groups indicates the target age group or audience (for example, preschool, elementary school, middle school, high school, college, adult learners, etc.) for the lesson, Description/lesson plan indicates detailed written explanation of the lesson's content, tags indicates the content of the video, visibility parameter determines the visibility settings (for example, public or private) for the video, specifying who can view the video.

Figure 4:
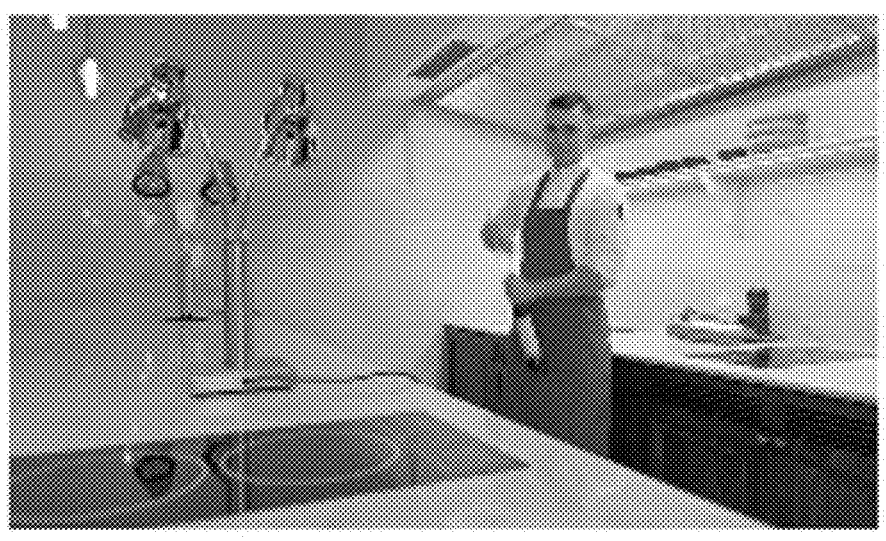
FIG. 4 illustrates a Video Display Interface Unit for displaying uploaded video to create overlay videos, in accordance with some embodiments.

FIG. 4 illustrates the Video Display Interface Unit 106 for displaying the uploaded video to create overlay videos, in accordance with some embodiments. The Video Display Interface Unit 106 can be configured to display the uploaded or recorded video game clips to create the one or more overlay elements on it. The uploaded video can be accessible to the content creator via the video display interface unit 106. The video display interface unit 106 ensures the content creators to conveniently access and interact with the uploaded content. The Video Display interface unit 106 serves as a canvas upon which educational overlays and enhancements can be rendered.

Figure 5:
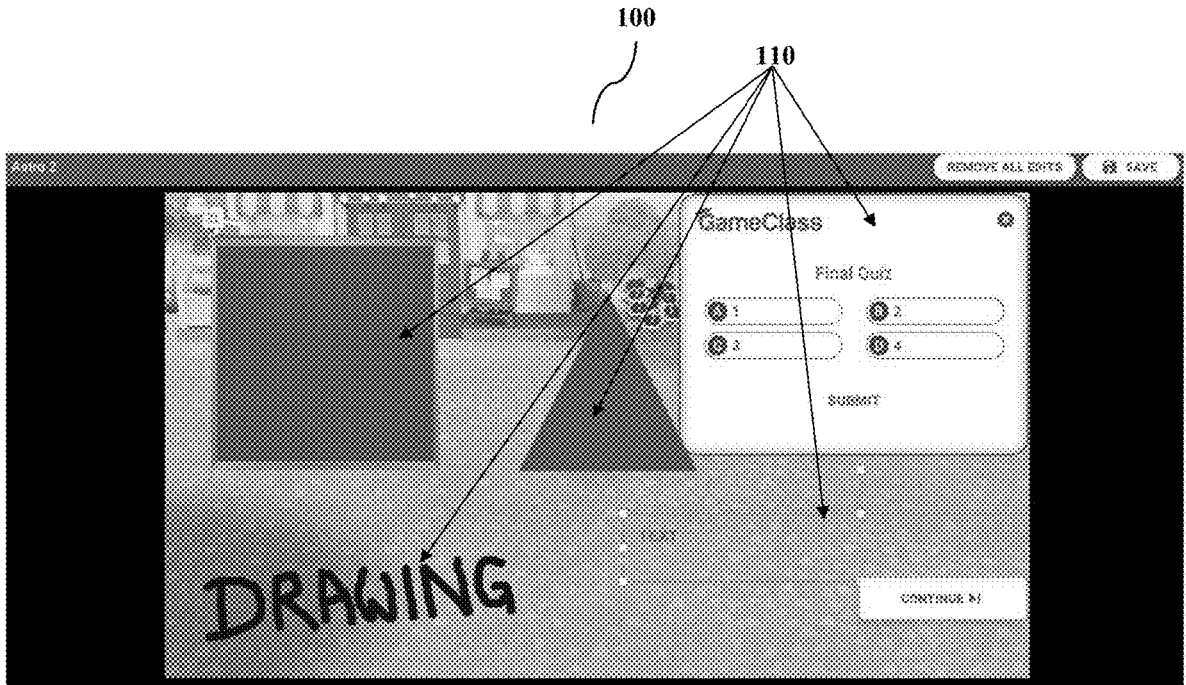
FIG. 5 illustrates an interactive video editing platform enabling the Overlay Screen Creation Unit to render one or more overlay elements onto an uploaded video, in accordance with some embodiments.

FIG. 5 illustrates the interactive video editing platform 100 enabling the Overlay Screen Creation Unit to render one or more overlay elements onto the uploaded videos, in accordance with some embodiments. The interactive video editing platform 100 enables the User Input Receiving Unit 108 to receive an input form the users (i.e. creators) to enable an overlay screen over the displayed video. Further, the interactive video editing platform 100 enables the Overlay Screen Creation Unit to render one or more overlay elements onto the overlay screen. The Overlay Screen Creation Unit 110 can be configured with various tools tailored for adding educational content as overlays onto the uploaded video to create the overlay videos. The overlay elements include at least one of voiceovers, videos, drawings, shapes, mathematical equations, numerical ratings, spelling, grammar corrections, text, highlights, pointers, calculators, rulers, measurements, arrows, chalkboards, colour boards, whiteboards, quizzes, and questions.

The Overlay Screen Creation Unit 110 configured with various tools including a whiteboard, chalkboard, color board tool, resembling a classroom whiteboard, enabling the content creators to incorporate drawings, text, shapes and quiz as shown in FIG. 5, wherein. The Overlay Screen Creation Unit 110 can also be configured to adjust the duration of display of the one or more overlay elements on the overlay screen.

Figure 6:
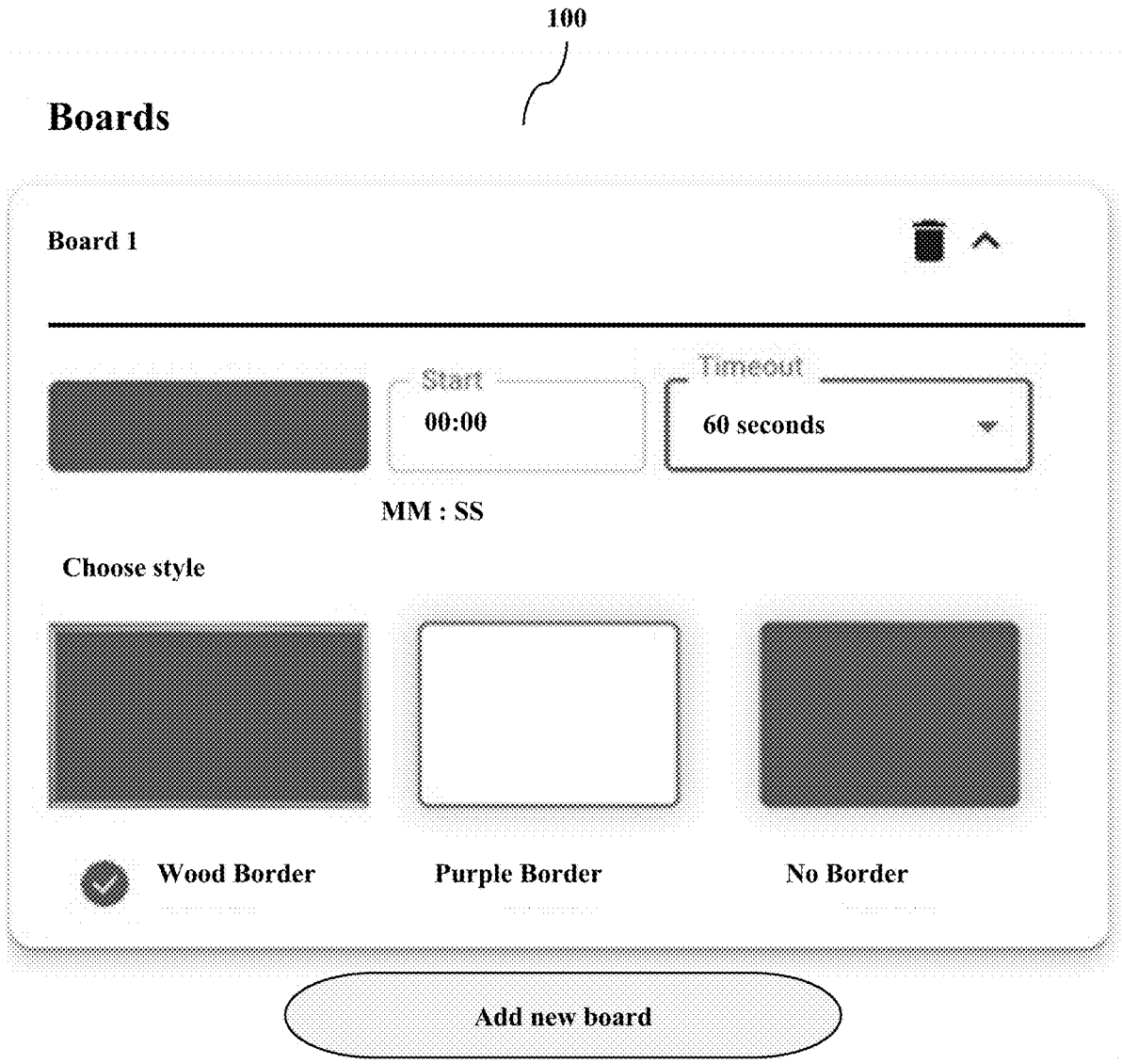
FIG. 6 illustrates an interactive video editing platform to enable boards as an overlay on an uploaded video, in accordance with some embodiments.

FIG. 6 illustrates the interactive video editing platform 100 to enable boards as an overlay on the uploaded video, in accordance with some embodiments.

The boards enabled on the interactive video editing platform 100 configured with several customizable options to enhance the educational experience. In an embodiment, the interactive video editing platform 100 configured to modify the color of the board. Thus, the interactive video editing platform 100 enables the users (content creators) to select the color of the board, allowing them to tailor the visual appearance to their preferences or to align with the overall aesthetic of the video. This feature typically involves a color picker tool that enables users to choose from a wide range of colors.

In another embodiment, the interactive video editing platform 100 configured to enable the duration of the Board (Timeout) to display. Thus, the interactive video editing platform 100 helps the users to determine how long the board remains visible on the interactive video editing platform 100 before disappearing. The timeout duration can be adjusted according to the specific needs of the lesson or the pace of the content being presented. The timeout allows the users to control the timing of when the board appears and disappears during the display of the overlay video to the viewers.

In another embodiment, the interactive video editing platform 100 configured to enable the Start Time, wherein the users have the ability to specify the exact point in the video timeline where the board should start appear. This start time parameter allows users to strategically place the board at any desired moment within the video, ensuring relevance and context to the content being discussed. Additionally, the interactive video editing platform 100 configured to enable overlaying other content on top of the board, such as text, graphics, and shapes. This capability enables users to further enrich the educational content by adding supplementary information, visual aids, or annotations directly onto the board. Users can seamlessly integrate these elements to enhance comprehension and engagement for viewers. Moreover, during a class or presentation, users have the option to scribble or draw directly on top of the board to explain concepts to students in real-time. This interactive functionality enables educators to dynamically illustrate ideas, clarify complex topics, or provide additional context during the instructional session. Users can utilize drawing tools to create freehand annotations, fostering active participation and understanding among students.

FIG. 7 illustrates the interactive video editing platform 100 to enable quiz as an overlay on the uploaded video, in accordance with some embodiments In FIG. 7, the illustration depicts the interactive video editing platform 100, showcasing its functionality in facilitating quizzes as overlays on the uploaded videos. The interactive video editing platform 100 configured to create engaging educational content by incorporating interactive quizzes over the uploaded videos. These quizzes serve as dynamic tools for assessing student comprehension and engagement with the material presented within the video content.

The interactive nature of the quizzes allows users to overlay a predetermined set of questions directly onto the video timeline. This strategic placement enables educators and content creators to seamlessly integrate assessment opportunities into their instructional videos, enhancing the learning experience for viewers. Additionally, users have the flexibility to customize the quiz content according to their specific educational objectives and preferences.

As viewers interact with the video content, they encounter the quiz questions overlaid at designated intervals throughout the duration of the video. This interactive engagement encourages active participation and critical thinking skills development among students. Moreover, the interactive video editing platform 100 facilitates real-time tracking of student responses to the quiz questions, providing valuable insights into individual performance and understanding. In some embodiments, the interactive video editing platform 100 Utilizing sophisticated AI tools to generate personalized recommendations. These AI-driven recommendations aim to support student learning by identifying areas of strength and weakness, as well as suggesting relevant supplementary materials or resources.

Figure 8:
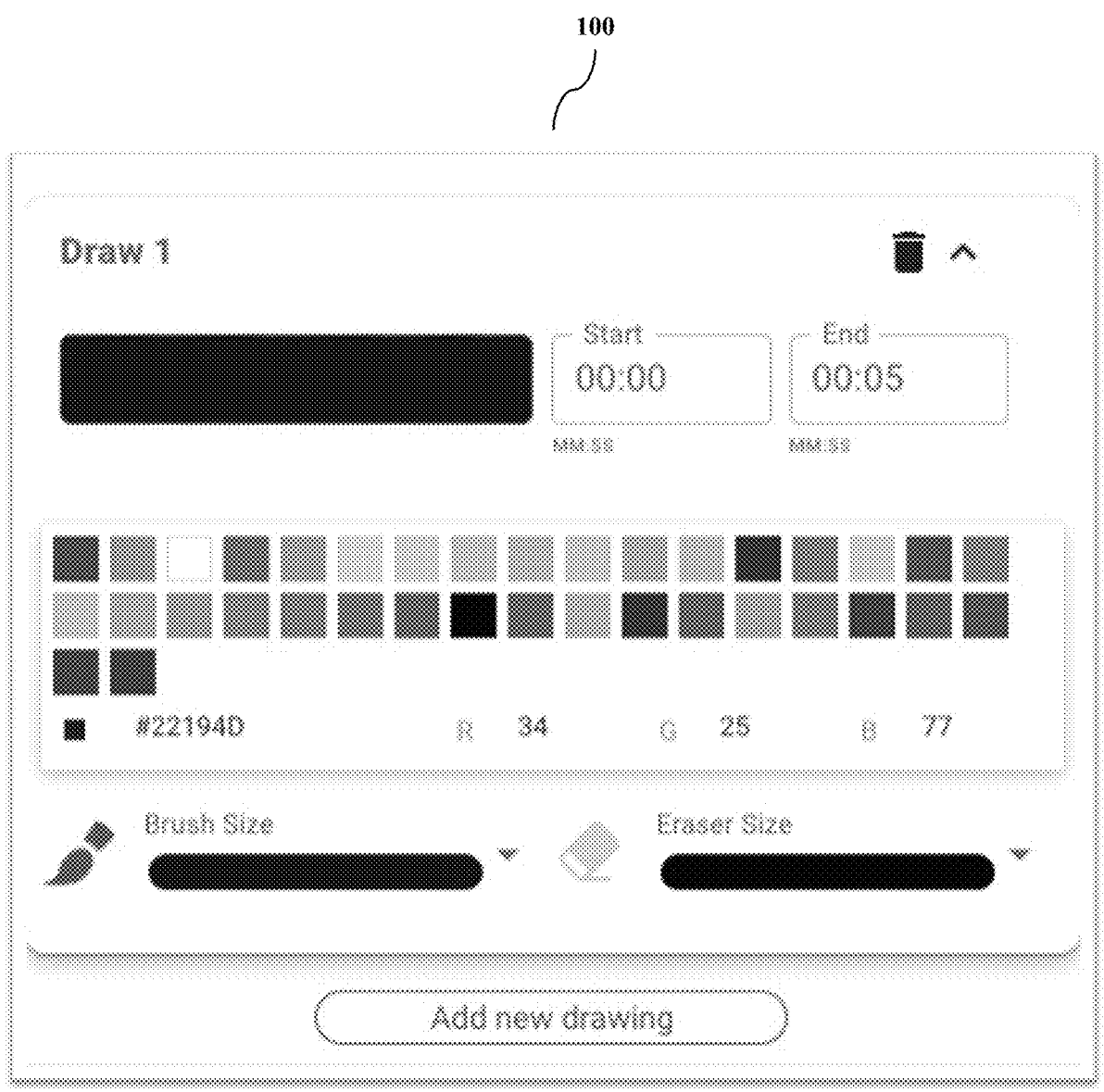
FIG. 8 illustrates the interactive video editing platform enabling to overlay freehand drawing on an uploaded video, in accordance with some embodiments.

FIG. 8 illustrates the interactive video editing platform 100 enabling to overlay freehand drawing on the uploaded video, in accordance with some embodiments.

The interactive video editing platform 100 enables freehand drawing overlays onto the uploaded videos. This helps the users to enhance their video content by overlaying free hand-drawings directly onto the video timeline by setting start and end time. Thus, the overlay freehand drawings provide educators and content creators with a versatile means of customizing and enriching the video presentations to cater to diverse learning styles and preferences.

Figure 9:
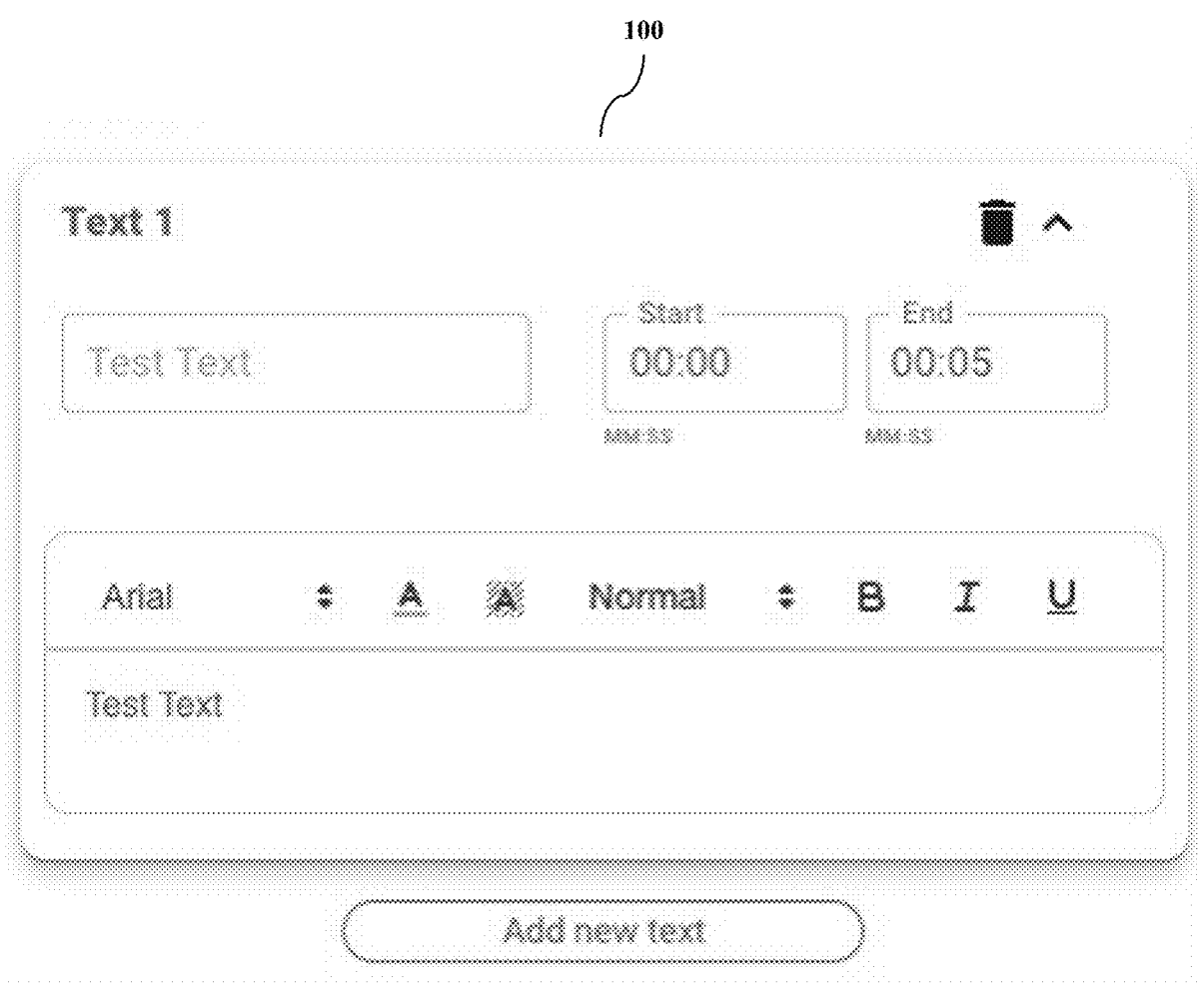
FIG. 9 illustrates the interactive video editing platform enabling to overlay text on an uploaded video, in accordance with some embodiments.

FIG. 9 illustrates the interactive video editing platform 100 enabling to overlay text on the uploaded video, in accordance with some embodiments.

The interactive video editing platform 100 enables text overlays onto the uploaded videos. This helps the users to enhance their video content by overlaying the text directly onto the video timeline by setting start and end time. Thus, the text overlays enable educators and content creators with a versatile means of customizing and enriching the video presentations to cater to diverse learning styles and preferences.

Figure 10:
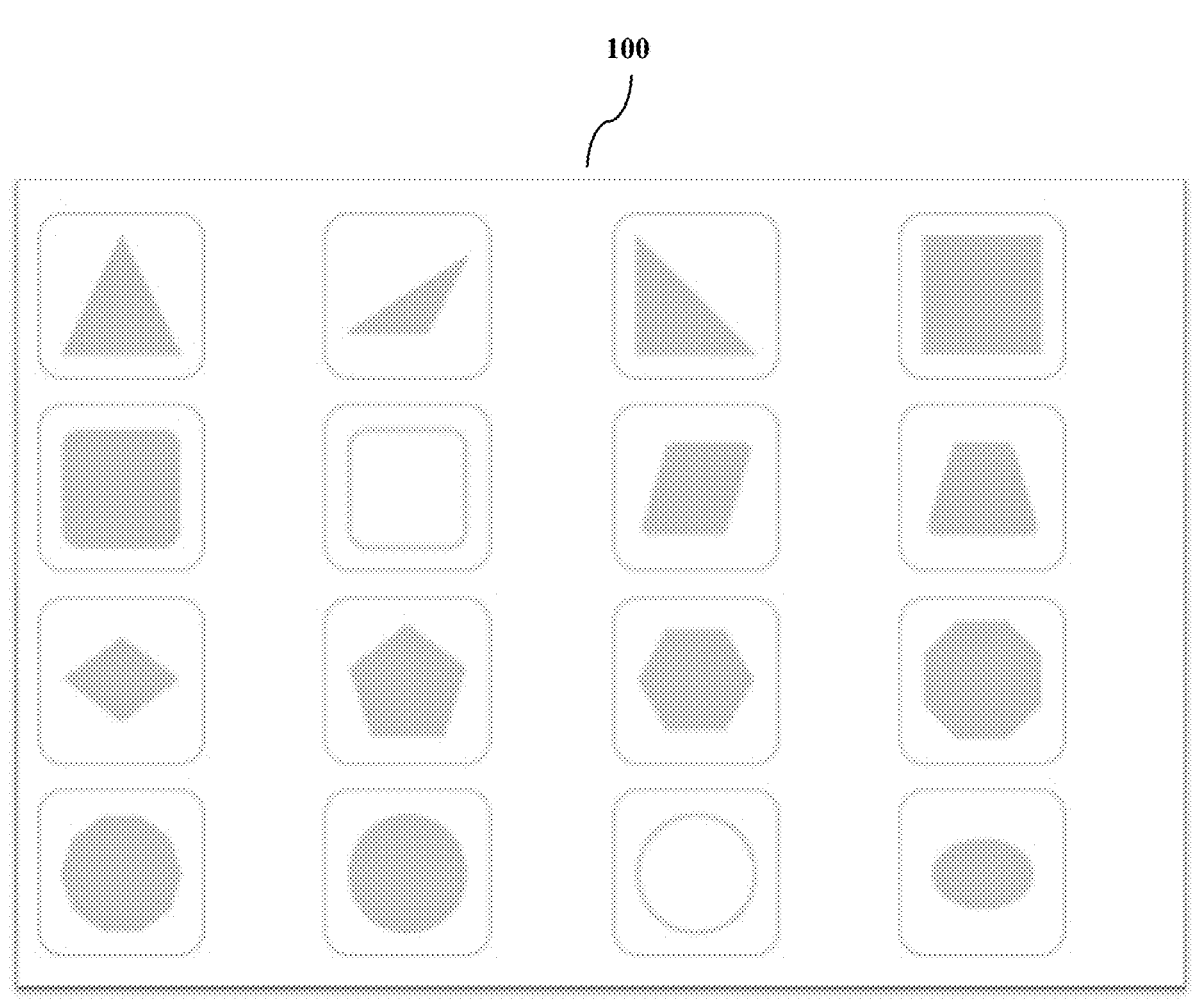
FIG. 10 illustrates the interactive video editing platform enabling to overlay various shapes on an uploaded video, in accordance with some embodiments.

FIG. 10 illustrates the interactive video editing platform 100 enabling to overlay various shapes on the uploaded video, in accordance with some embodiments.

The interactive video editing platform 100 enables overlaying of various shapes onto the uploaded videos. This feature allows users to enhance their video content by overlaying a diverse range of shapes, including geometrical shapes, mathematical equations, symbols, numbers, and more. By incorporating these shapes directly onto the video timeline, users can visually illustrate concepts, emphasize key points, or provide supplementary information to enhance viewer comprehension. Thus, enabling overlaying of various shapes onto the uploaded videos helps the educators and creators to convey complex ideas effectively and engage viewers in a more interactive learning experience.

Figure 11:
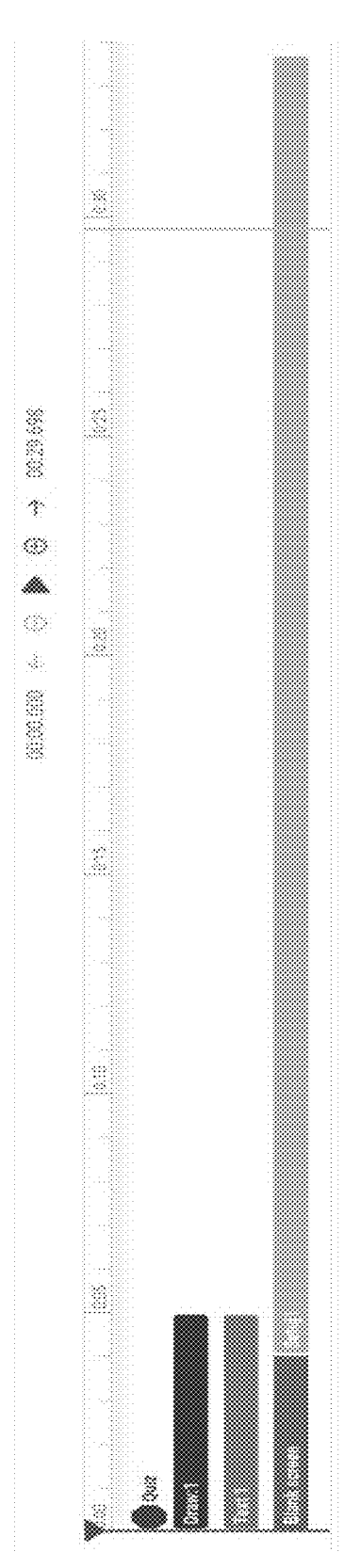
FIG. 11 illustrates the interactive video editing platform enabling a timeline feature, in accordance with some embodiments.

FIG. 11 illustrates the interactive video editing platform 100 enabling a timeline feature, in accordance with some embodiments. The interactive video editing platform 100 with timeline feature enables users to precisely control the placement and duration of various components within the video. By utilizing the timeline, users can specify when different elements, such as overlays, transitions, or effects, appear and for how long they remain visible. This functionality provides users with granular control over the editing process, allowing for seamless synchronization and display of content.

In some embodiments, the interactive video editing platform 100 configured to enable transformation of entertainment-based video games into educational lessons. The interactive video editing platform 100 configured with tools and features tailored for educational content creation, enabling content creators to repurpose video game elements for educational purposes.

In some embodiments, the interactive video editing platform 100 configured to utilize online educational-focused overlays. These overlays serve as transformative tools, allowing content creators to seamlessly integrate educational content into entertainment-based video games, thereby enhancing the learning experience.

In some embodiments, the interactive video editing platform 100 configured to enable creation of a video game education overlay known as "Boards." These boards, comprising teaching boards such as chalkboards, whiteboards, and color boards, are integrated into the video game environment and pause the gameplay for a specified duration. This feature ensures active engagement of online learners by providing interactive teaching overlays within the video game interface.

In some embodiments, the interactive video editing platform 100 configured to enable online contests as a means to incentivize the creation of educational video game lessons. Through these contests, creators are rewarded for their contributions, fostering creativity and innovation within the educational gaming community.

In some embodiments, the interactive video editing platform 100 configured to enable an online rating system, known as "highlights," offering brief segments of video game content with a rating overlay. This system allows users to evaluate and provide feedback on video game clips, enhancing the overall quality of educational content available.

In some embodiments, the interactive video editing platform 100 configured to enable an online marketplace dedicated to video game education courses. This marketplace provides a platform for creators to share and monetize their educational content, thereby increasing accessibility to transformative learning materials.

In some embodiments, the interactive video editing platform 100 configured with an online storage of video game education lessons, ensuring accessibility and organization for users seeking educational resources.

In some embodiments, the interactive video editing platform 100 configured to enable selling of video games through online video game education lessons, providing a unique avenue for distribution and promotion.

In some embodiments, the interactive video editing platform 100 configured to enable tagging of educational subjects and historical landmarks within online video game education lessons, improving searchability and categorization for enhanced accessibility.

In some embodiments, the interactive video editing platform 100 configured to transform entertainment-based video games into spelling, vocabulary, and grammar lessons by using online overlays to conceal the real identity of video game text.

In some embodiments, the interactive video editing platform 100 configured to transform entertainment-based video games into mathematical lessons using online overlays to turn characters and environments into numerical sets, statistics, and probability equations.

In some embodiments, the interactive video editing platform 100 configured to transform entertainment-based video games into language lessons by translating characters, dialogue, and environments into different languages.

In some embodiments, the interactive video editing platform 100 configured to transform entertainment-based video games using shape overlays that create points of interest, teaching geography lessons through interactive exploration.

In some embodiments, the interactive video editing platform 100 configured to transform entertainment-based video games into sports coaching by using online overlays to highlight movements and techniques.

In some embodiments, the interactive video editing platform 100 configured to transform entertainment-based video games into military tactics and strategy lessons using the online overlays of a video game education editor.

In some embodiments, the interactive video editing platform 100 configured to transform entertainment-based video games into finance and economics lessons using the overlays of an online video game education editor.

In some embodiments, the interactive video editing platform 100 configured to transform entertainment-based video games into educational lessons designed to teach shapes using shape overlays that go over shapes in video games.

In some embodiments, the interactive video editing platform 100 configured to transform entertainment-based video games into AI lessons using the online overlays.

In some embodiments, the interactive video editing platform 100 configured to transform entertainment-based virtual reality video games to teach educational lessons using the overlays of an online video game education editor.

In some embodiments, the interactive video editing platform 100 configured to establish an online sharing network specifically for entertainment-based video games that were transformed into educational lessons.

In some embodiments, the interactive video editing platform 100 configured to host online contests specifically rewarding entertainment-based video games that were transformed into educational lessons.

In some embodiments, the interactive video editing platform 100 configured to transform entertainment-based spatial computing video games into educational lessons.

In some embodiments, the interactive video editing platform 100 configured to transform entertainment-based video game character decision making into real-life decision-making through the use of question and quiz overlays.

In some embodiments, the interactive video editing platform 100 configured to utilize video game education overlays to assess the choices and decisions of video game players.

In some embodiments, the interactive video editing platform 100 configured to use overlays to coach video game players into performing better in video games.

In some embodiments, the interactive video editing platform 100 configured for verification of real-life teachers to specifically transform entertainment-based video games into educational lessons. The verification of the real-life teachers can be done by providing the credentials of the teacher including the school name, address, profile image or any other details that may be used to verify the authenticity of the teacher.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

I claim:

1. An interactive video editing platform for creating overlay videos, the interactive video editing platform comprising:

a Video display interface unit configured to:

display gameplay footage on an interactive video editing platform, wherein the gameplay footage comprises at least one of a pre-existing video, a recorded video game clip, a screen recording, a video recording, or an audio recording, wherein the gameplay footage is uploaded to the interactive video editing platform through a Video Uploading User Interface Unit, wherein the gameplay footage is stored in association with a timeline, an overlay screen creation unit configured to:

enable an overlay screen over the displayed gameplay footage to render one or more overlay elements, wherein the overlay screen is enabled by receiving input from a creator on the gameplay footage through a user input receiving unit;

integrate one or more overlay elements onto the overlay screen displayed over the gameplay footage, wherein each overlay element is associated with educational metadata and linked to a corresponding position on the timeline of the gameplay footage;

an AI-driven assessment module configured to generate AI-generated assessments and lessons from the gameplay footage, by:

detecting one or more parameters from the gameplay footage, wherein the one or more parameters include in-game events, player interactions, and environmental changes;

classifying the detected one or more parameters and mapping them to predefined educational concepts, learning objectives, or curriculum standards;

generating overlay elements based on the mapped predefined educational concepts, learning objectives, or curriculum standards; and integrating the generated overlay elements into the gameplay footage for student assessments, wherein the generated overlay elements include at least one of questions, quizzes, notes, shapes, text, and drawings; and a rendering unit configured to:

render the integrated one or more overlay elements onto the overlay screen displayed over the gameplay footage in real-time to generate an overlay video, wherein the overlay video enables user interaction, navigation, or retrieval of portions of the gameplay footage based on the overlay elements associated with metadata and their linked timeline positions.

2. The interactive video editing platform of claim 1, wherein the AI-driven assessment module is further configured to:

automatically adjusting question difficulty and content based on the student responses and engagement patterns for the generated overlays; and analyzing student interactions with the AI-generated assessments and provide performance insights and adaptive recommendations for personalized learning.

3. The interactive video editing platform of claim 1, wherein the AI-driven assessment module enables computer vision, natural language processing and knowledge graphs to identify one or more parameters from gameplay and correlate the detected in-game events with subject-specific learning modules, ensuring alignment with predefined educational objectives.

4. The interactive video editing platform of claim 1, wherein the AI-driven assessment module allows educators to review and refine generated overlays, incorporating manual adjustments and customization options to enhance lesson accuracy and relevance, and the module also records interaction data, analyses engagement patterns, and dynamically adapts lesson content in real time based on student responses and participation levels.

5. The interactive video editing platform of claim 1, wherein the overlay screen creation unit is further configured to integrate accessibility-focused specialized overlay elements into the gameplay footage to support disabled students, wherein the accessibility-focused specialized overlay elements include special education prompts, ADHD overlays, ASL (American Sign Language) gestures, autism overlays, executive function overlays, neurodivergent overlays, adaptive shapes, and sign language symbols.

6. The interactive video editing platform of claim 5, wherein the accessibility-focused specialized overlay elements allow educators to customize question formats, including pictorial representations, simplified text prompts, and interactive response options tailored for students with cognitive disabilities and enables gesture-based or alternative input recognition, allowing students with limited motor function to interact with educational overlays through at least one of eye-tracking, speech commands, or adaptive controllers.

7. The interactive video editing platform of claim 5, wherein the AI-driven assessment module is configured to analyse student engagement and performance metrics to recommend personalized accessibility tools and content modifications.

8. The interactive video editing platform of claim 1, wherein the interactive video editing platform further comprising:

a curated video game clip repository containing a database of entertainment-based gameplay footage pre-selected and organized for educational use;

a curated lesson repository comprising a database of pre-made lessons categorized by subject and gameplay footage, serving as a starting point for lesson creation;

a context-aware tagging system that categorizes video game clips based on learning objectives, skill levels, and interactive engagement potential;

a dynamic content personalization engine configured to automatically match video game templates to curriculum standards, student interests, learning subjects, and educator-defined lesson plans; and a cloud-based lesson integration tool that enables users to embed game clips into customized lessons, quizzes, and interactive assessments with minimal manual editing.

9. The interactive video editing platform of claim 8, wherein each video game clip is tagged with subject-specific metadata, including STEM concepts, special education terminology, historical references, Esports concepts, and critical thinking challenges.

10. The interactive video editing platform of claim 8, wherein an AI-driven recommendation system suggests relevant video game templates based on teacher preferences, student preferences, student progress data, and trending educational themes.

11. The interactive video editing platform of claim 1, further comprising an AI-driven student engagement and interaction analysis module, configured to:

monitor and record student responses, time spent on lessons, editor overlay usage, AI usage, AI prompts, AI responses, quiz attempts, and participation levels within interactive video content;

calculate a dynamic engagement score based on student interaction frequency, response accuracy, time on task, and depth of interaction;

assess student activity levels by tracking lesson completion rates, interaction timestamps, and question response rates;

provide educators with student statistics, trend analysis, and engagement heatmaps for personalized instructional adjustments; and forecast student performance outcomes using machine learning algorithms based on historical interaction data and engagement trends.

12. The interactive video editing platform of claim 11, further comprising a student profile system that aggregate long-term learning insights, strengths, and knowledge gaps to enable adaptive lesson recommendations.

* * * * *